US008826273B1

(12) United States Patent
Chen (10) Patent No.: US 8,826,273 B1
(45) Date of Patent: Sep. 2, 2014

(54) SYNCHRONOUSLY LOGGING TO DISK FOR MAIN-MEMORY DATABASE SYSTEMS THROUGH RECORD AND REPLAY

(75) Inventor: Xiaoxin Chen, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 397 days.

(21) Appl. No.: 12/976,073

(22) Filed: Dec. 22, 2010

(51) Int. Cl.
*G06F 9/455* (2006.01)

(52) U.S. Cl.
USPC .................................................. 718/1

(58) Field of Classification Search
None
See application file for complete search history.

(56) References Cited

U.S. PATENT DOCUMENTS

| | | | |
|---|---|---|---|
| 2009/0007111 A1* | 1/2009 | Nelson et al. | 718/1 |
| 2009/0119665 A1* | 5/2009 | Venkitachalam et al. | 718/1 |
| 2009/0248611 A1* | 10/2009 | Xu et al. | 707/1 |
| 2009/0249049 A1* | 10/2009 | Weissman et al. | 712/238 |
| 2012/0131559 A1* | 5/2012 | Wu et al. | 717/132 |

OTHER PUBLICATIONS

George Dunlap et al., "ReVirt: Enabling Intrusion Analysis through Virtual-Machine Logging and Replay," Dec. 2002, USENIX Association, p. 211-224.*
George Washington Dunlap (Execution replay for intrusion analysis, Doctor of Philosophy in The University of Michigan, 2006).*
Samuel et al.: ReVirt: Enabling Intrusion Analysis through Virtual-Machine Logging and Replay, Dec. 2002, USENIX Association, p. 211-224.*

* cited by examiner

*Primary Examiner* — Emerson Puente
*Assistant Examiner* — Sisley Kim (57) ABSTRACT

An in-memory database management system (DBMS) in a virtual machine (VM) preserves the durability property of the ACID model for database management without significantly slowing performance due to accesses to disk. Input data relating to a database transaction is recorded into a replay log and forwarded to the VM for processing by the DBMS. An indication of a start of processing by the DBMS of the database transaction is received after receipt of the input data by the VM and an indication of completion of processing of the database transaction by the DBMS is subsequently received, upon which outgoing output data received from the VM subsequent to the receipt of the completion indication is delayed. The delayed outgoing output data is ultimately released upon a confirmation that all input data received prior to the receipt of the start indication has been successfully stored into the replay log, thereby preserving durability for the database transaction.

20 Claims, 5 Drawing Sheets

SYNCHRONOUSLY LOGGING TO DISK FOR MAIN-MEMORY DATABASE SYSTEMS THROUGH RECORD AND REPLAY

CROSS REFERENCE TO RELATED APPLICATIONS

This application is related to the patent application Ser. No. 12/976,056 entitled "Efficient Overcommitment of Main-Memory Based Virtual Database System to Disk", which is assigned to the assignee of this application and has been filed on the same day as this application.

FIELD OF THE INVENTION

Embodiments of the present invention relate generally to the field of online transaction processing (OLTP) and database management systems (DBMS).

BACKGROUND OF THE INVENTION

Database systems are becoming increasingly specialized for specific workloads. In particular, an in-memory database management system (DBMS) becomes more appropriate for OLTP as the vast increases in Internet and telecommunication-based applications require shorter response times and higher throughput in transaction processing (i.e., features that cannot be provided by disk-based systems due to slow disk access response times).

Recent work in the OLTP database area has demonstrated performance improvements of close to two orders of magnitude by running DBMS in main memory for OLTP when compared to traditional disk-based DBMS. There are, however, significant limitations that have prevented widespread adoption of such in-memory DBMS. Typically, the property of "durability" in the ACID model (atomicity, consistency, isolation, durability) for database management is satisfied by "synchronously" logging update and insertion transactions to disk, ensuring that the transactions are committed and written to persistent storage (e.g., disk) prior to notifying the requestor of such transactions of their successful completion (i.e., in contrast to "asynchronously" logging transactions to disk after notifying the requestor of successful completion, which is less likely to satisfy the durability concerns). However, because disk accesses are slow in comparison to memory accesses, committing and writing update and insertion transactions to disk in such a synchronous manner prior to notifying the requestor of successful completion can significantly slow down the response times of an in-memory DBMS for OLTP, which caches data in memory precisely to avoid such slower accesses to disk.

To address performance bottlenecks caused by such slow disk access required for durability, certain in-memory database systems have multi-threaded capabilities so that transactions can be serviced in parallel (e.g., launching a new thread for each new database transaction). In such systems, synchronously logging a transaction to disk for one transaction in one thread, while slowing down the performance for the transaction itself, does not impede completion of a different transaction (i.e., running in another thread) that is accessing different data in the database (i.e., does not conflict with other transactions). However, such multi-threaded systems require complicated data access (e.g., locking or latching mechanisms to avoid collisions between threads), buffer management (e.g., for allocating memory for the parallel threads) and logging (e.g., for more efficiently writing data for multiple parallel transactions to disk) capabilities that often cause significant performance penalties due to the necessary computing overhead to implement such capabilities.

In contrast, single threaded in-memory database systems service transactions serially in a single thread rather than in parallel through multiple threads. As such, single-threaded in-memory database systems do not require the aforementioned mechanisms to manage issues arising from parallelism and therefore do not suffer from any computing overhead required to implement such mechanisms. However, single-threaded in-memory database systems cannot synchronously log a transaction to disk without affecting the response times of all subsequent transactions received by system since such transactions are serviced sequentially. Current single-threaded in-memory database system instead rely on standby replicas to satisfy durability requirements. However, many database administrators do not feel that standby replicas (which essentially provide another in-memory backup of the transactions) sufficiently address durability concerns.

Furthermore, the possible size of system memory for a computer system remains a limiting factor in the performance of an in-memory database system running on the computer system. Traditional virtual memory management techniques of overcommitting available system memory by providing virtual memory address spaces that are larger than the available system memory itself and then swapping pages of memory to disk when the computer system experiences memory pressure can further degrade performance of an in-memory database system on a single computer system due to the slow accesses to disk. While in-memory database systems can be implemented for large scale data intensive applications using a cluster of computer systems that can, in the aggregate, provide significantly more system memory than a single computer system, such clustered systems require complex techniques to properly balance and partition data among the clustered systems and minimize network bandwidth and latency issues.

BRIEF SUMMARY OF THE INVENTION

One or more embodiments provide techniques to improve performance of in-memory database management systems by persisting database transactions to disk in a timely fashion to satisfy durability in the ACID model without significantly slowing performance. One method is disclosed herein for running a database management system (DBMS) in a virtual machine (VM) to preserve a durability property of the ACID model for database management. According to the method, input data (e.g., from the network, in one embodiment) is received and recordation of the input data into a log stored in a persistent storage device is requested, wherein the log stores non-deterministic events occurring during an execution flow of the VM to preserve a capability to subsequently replay the execution flow of the VM. The input data is forwarded to the VM for processing by the DBMS and an indication of a start of processing by the DBMS of a database transaction corresponding to the received input data is received after receipt of the input data by the VM. An indication of a completion of processing of the database transaction by the DBMS is subsequently received and outgoing output data received from the VM subsequent to the receipt of the completion indication is delayed. The delayed outgoing output data is ultimately released upon a confirmation that all input data received prior to the receipt of the start indication has been successfully stored into the log, thereby preserving durability for the database transaction.

BRIEF DESCRIPTION OF THE DRAWINGS

Various aspects of at least one embodiment of the present invention are discussed below with reference to the accompanying figures. In the figures, which are not intended to be drawn to scale, each identical, or nearly identical, component that is illustrated is represented by a like numeral. For purposes of clarity, however, not every component may be labeled in every drawing. The figures are provided for the purposes of illustration and explanation and are not intended as a definition of the limits of the invention.

In the figures.

DETAILED DESCRIPTION OF THE INVENTION

As will be described below, in certain embodiments, deterministic record and replay techniques are used in a single threaded in-memory database system to achieve throughput comparable to current in-memory database management systems (e.g., utilizing standby replicas, etc.) while still persisting transaction data to disk in a manner that satisfies the durability requirements of the ACID model.

In addition, certain embodiments also overcommit the active memory of the in-memory database system to solid-state drives (SSD) and prefetch data from the SSDs into active memory before a transaction starts so that the in-memory database system can execute transactions at the same speed as a non-overcommitted in-memory database system. In certain of such embodiments, prefetching data from an SSD is implemented by running clone database engines of a primary database engine to pre-process queued transactions (i.e., transactions queued up but not yet being processed by the primary database engine) on additional CPU cores of a host computer system supporting the database engines in order to "warm up" a memory space that is shared among the clone and primary database engines, thus enabling the primary database engine to run as a single threaded in-memory database system without blocking in order to page in required data from the SSD at the time the primary database engine services the transaction itself.

The architecture of certain embodiments incorporate virtualization to achieve the abovementioned durability and memory overcommitment capabilities. For example, embodiments may be implemented on a virtualized system such as the vSphere product offering from VMware, Inc. of Palo Alto, Calif. (VMware).

It should be recognized that virtualized systems are well known. A general overview of a virtualized system within which embodiments can be implemented will be described. It is not intended, however, to be a complete explanation of virtualization but will serve to help describe the embodiments set forth below.

A virtual machine ("VM") is an abstraction (a "virtualization") of a physical computer system. A virtualized computer system 100 is presented in FIG. 1. A virtual machine 102 is installed on a host platform that includes system hardware 104. System hardware 104 includes one or more central processing units (CPUs) 106, memory 108, such as RAM (random access memory), one or more hard disks 110, various devices 112, such as network interface cards (NICs), a keyboard, a display, etc., one or more solid-state drives 114 and a network adapter 115. A solid state drive (SSD) is a type of data storage device that uses solid-state memory to store data. Given its faster start up, better random access performance, and higher reliability, an SSD can be used, for example, to replace a hard disk drive as the SSD emulates the interface for a hard disk drive interface.

Figure 1:
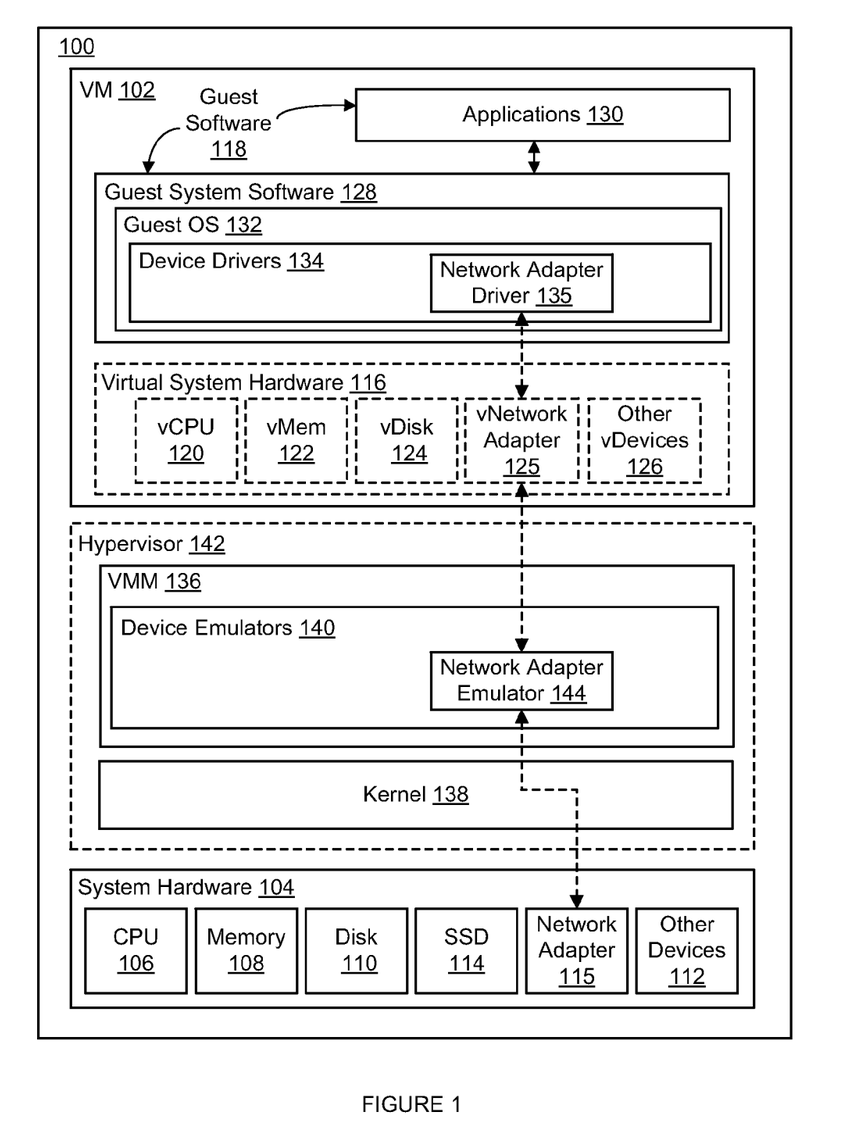
FIG. 1 depicts an embodiment of virtualization computer system on which embodiments of the present invention may be implemented.

VM 102 includes virtual system hardware 116 and guest software 118. Virtual system hardware 116 includes one or more virtual CPUs 120, virtual memory 122, one or more virtual hard disks 124, a virtual network adapter 125, and one or more various other virtual devices 126. Guest software 118 includes guest system software 128 and guest applications 130. Guest system software 128 includes a guest operating system ("guest OS") 132 with device drivers 134 that "communicate" with virtual network adapter 125 and other virtual devices 126. It should be recognized, however, that virtual system hardware 116 is a conceptual layer that is presented to guest OS 132 by, for example, device emulators 140 within virtualization software in computer system 100, as further described below. In some virtualized computer systems, virtual system hardware 116 may have the same general architecture as the underlying physical system hardware, while in other virtualized computer systems, virtual system hardware 116 may be a different hardware architecture from that of the underlying physical system hardware. That is, the virtual hardware interface and resources visible to guest system software 128 are mapped by virtualization software onto the interface and resources of the system hardware 104. In some implementations, this mapping is invisible to guest system software 128.

In implementations where the mapping is invisible to guest system software 128, guest system software 128 generally interfaces with virtual system hardware 116 in the same way as it would interface with actual system hardware on a non-virtualized machine. For example, the guest OS 132 interfaces with virtual disk 124 and/or virtual memory 122 to access an executable guest application file. These interactions are transparently mapped by virtualization software to actual system hardware 104 that can provide the requested resources.

Virtualization software, also referred to herein as hypervisor 142, can include a virtual machine monitor (VMM) 136 and a virtualization kernel 138. Hypervisor 142 generally supports the running of VMs on a computer system 100 and, depending upon context, can refer to the functions provided by VMM 136 and the kernel 138 together, by VMM 136 alone or by kernel 138 alone. Furthermore, it should be recognized that reference to VMMs and virtualization kernels as used herein are merely exemplary and that alternative uses of these terms are possible. For example, VMM 136 may considered to be tightly coupled with, or even part of, the kernel 138 in alternative embodiments. As previously described, device emulators 140, including network adapter emulator 144, emulate system hardware to provide the perception of virtual system hardware 116 that is shown as part of the VM 102.

Virtual machines can be configured as "fully virtualized," in which no software components are included in guest software 118 other than those that would be found in a non-virtualized computer. For example, guest OS 132 could be a commercial, off-the-shelf OS with no components designed specifically to support a virtualized environment. Alternatively, "para-virtualized" virtual machines can include guest software 118 that is configured in some way to provide features that facilitate virtualization. For example, guest OS 132 that is specifically designed to avoid certain privileged instructions and certain memory address ranges can be part of a para-virtualized virtual machine. In another example of para-virtualization, a driver may be loaded into guest OS 132 that is designed to communicate with other virtualization components.

A virtualized computer system may be referred to as a "hosted" system when the virtualization software relies on system software that is separate from the virtualization software for certain functionality, such as for performing certain input/output (I/O) operations. For example, the virtualization software may rely on a separate, conventional host OS, installed directly on the system hardware, for providing such functionality. An example of a hosted virtualized computer system is the Workstation virtualization product made by VMware. Alternatively, a "non-hosted" virtualized computer system is one in which the virtualization software does not rely on separate system software to provide such functionality. Instead, such functionality is implemented in the virtualization software itself. The virtualized computer system 100 of FIG. 1 is a non-hosted virtualized computer system. An example of a non-hosted virtualized computer system is vSphere from VMware. It should be further recognized that reference to a computer system as a "host" or "host machine" herein, however, does not refer to whether such a system is a hosted or non-hosted virtualized system, but rather that the computer system is a host or host machine that supports the running of VMs (either in a hosted or non-hosted fashion).

Figure 2:
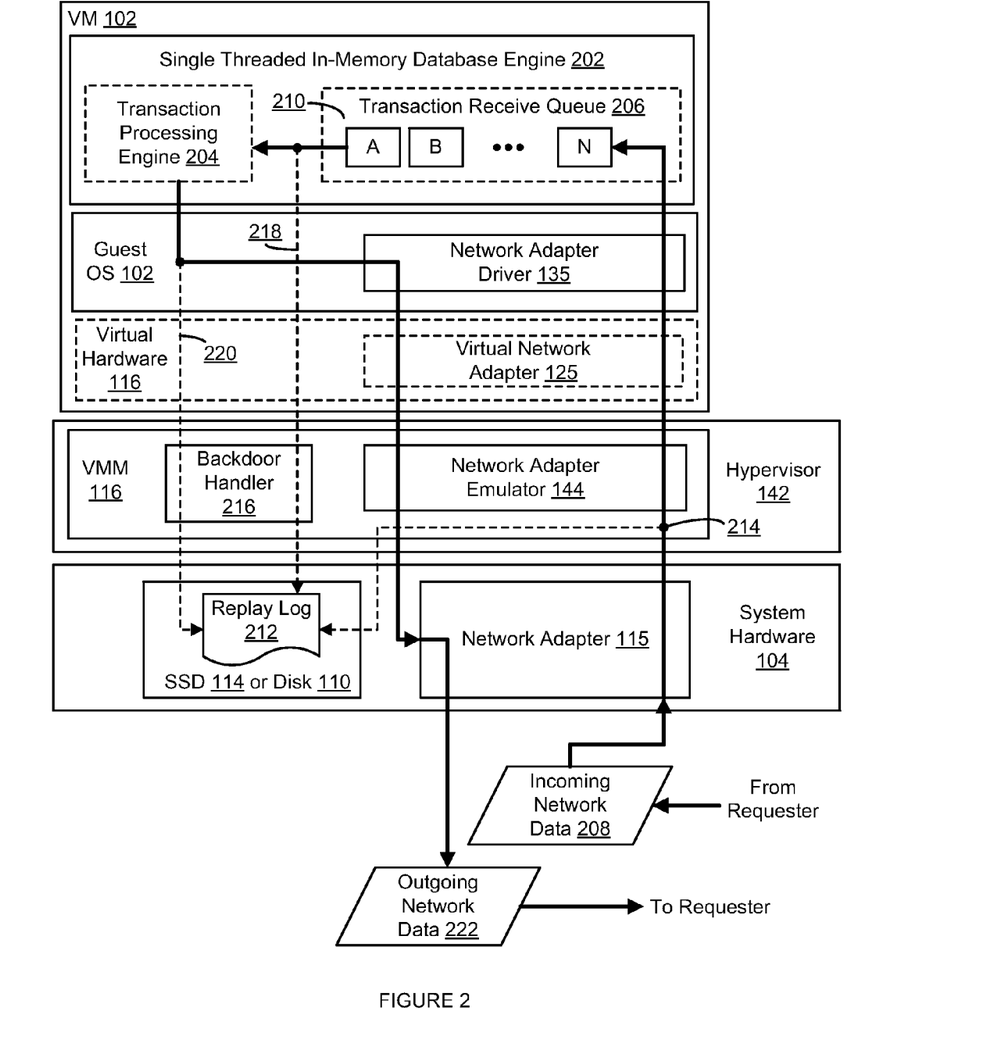
FIG. 2 depicts an in-memory database management system according to an embodiment.

Referring now to the embodiment of FIG. 2, a VM 102 runs a single-threaded in-memory database engine 202 in a manner that persists database transactions to disk in a timely fashion to satisfy durability in the ACID model without significantly slowing the performance of database engine 202. Database engine 202 comprises a transaction processing component 204 that processes database transactions in memory and a transaction receive queue 206 that receives incoming network data 208 from requesters and translates the network data into database transactions 210. As a single-threaded in-memory application, database engine 202 holds data in main memory and services all incoming database transactions 210 in sequential order (e.g., queuing transactions in receive queue 206 to the extent that it is unable to service them immediately due to the single thread, etc.).

While database engine 202 is running, as further described herein, hypervisor 142 takes and stores an initial image checkpoint "snapshot" of the memory state of VM 102 and then records and stores a replay log 212 to persistent storage (e.g., disk 110 or SSD 114). In one embodiment, hypervisor 142 records into the replay log non-deterministic events occurring in the execution flow of VM 102 after the image checkpoint, such as incoming network data 208 received from physical network adapter 115 and forwarded to network adapter emulator 144 (in certain embodiments, referred to as "vmxnet") to be provided to VM 102 (see dotted arrow 214), so that a back-up VM can load the image checkpoint into its memory and read replay log 212 and resubmit such non-deterministic event into its own virtual devices, thereby enabling the virtual devices of the back-up VM to deterministically replay the execution flow of VM 102 (e.g., up to the failure point). It should be recognized that many different types of non-deterministic events will trigger hypervisor 142 to record an entry into the replay log, such as network interrupts, timer interrupts, hard disk interrupts, and I/O device, e.g., keyboard and mouse, interrupts. Each entry in a replay log may, for example, contain input data relating to the event, a guest interrupt context, and a time-stamp or sequence number to determine when the non-deterministic event occurred in the execution stream of VM 102. In addition to recording such incoming non-deterministic events, through hypercalls, accesses to a special marker page, or other "backdoor" means to communicate with hypervisor 142 (e.g., through a backdoor handler 216), database engine 202 (or a proxy service acting on behalf of database engine 202) notifies hypervisor 142 when (1) it has received input (e.g., incoming network packets forwarded by hypervisor 142 to VM 102, etc.) relating to a database transaction (e.g., a query, update, insert, etc.) and (see dotted arrow 218), (2) it has finished servicing the received database transaction (see dotted arrow 220). Such notifications enable hypervisor 142 to additionally mark into replay log 212 the occurrence of the start and completion of database transactions from the perspective of database engine 202, thereby enabling hypervisor 204 to associate incoming network inputs 208 and outgoing data outputs 222 with corresponding database transactions and ensure that any incoming network inputs for a database transaction have been persistently stored to disk (e.g., in the replay log) prior to releasing any corresponding data output for the database transaction. In one embodiment, to maximize CPU cycles for servicing database transactions in database engine 202, all I/O interrupts are routed by hypervisor 142 to other CPU cores. Similarly, in another embodiment, rather than directly receiving incoming network data 208 and translating such data into database transactions 210 in receive queue 206, a DBMS front end server or management application (not shown) also runs in a separate VM on another CPU core of the computer system for handling database connections, generating query plans and dispatching transactions in the form of prepared query code to database engine 202. In another embodiment, replay log 212 may be implemented in accordance with U.S. Patent Publication 2009/0327574, "Replay Time Only Functionalities," filed Jun. 27, 2008, the entirety of which is incorporated by reference herein for all purposes.

Figure 3:
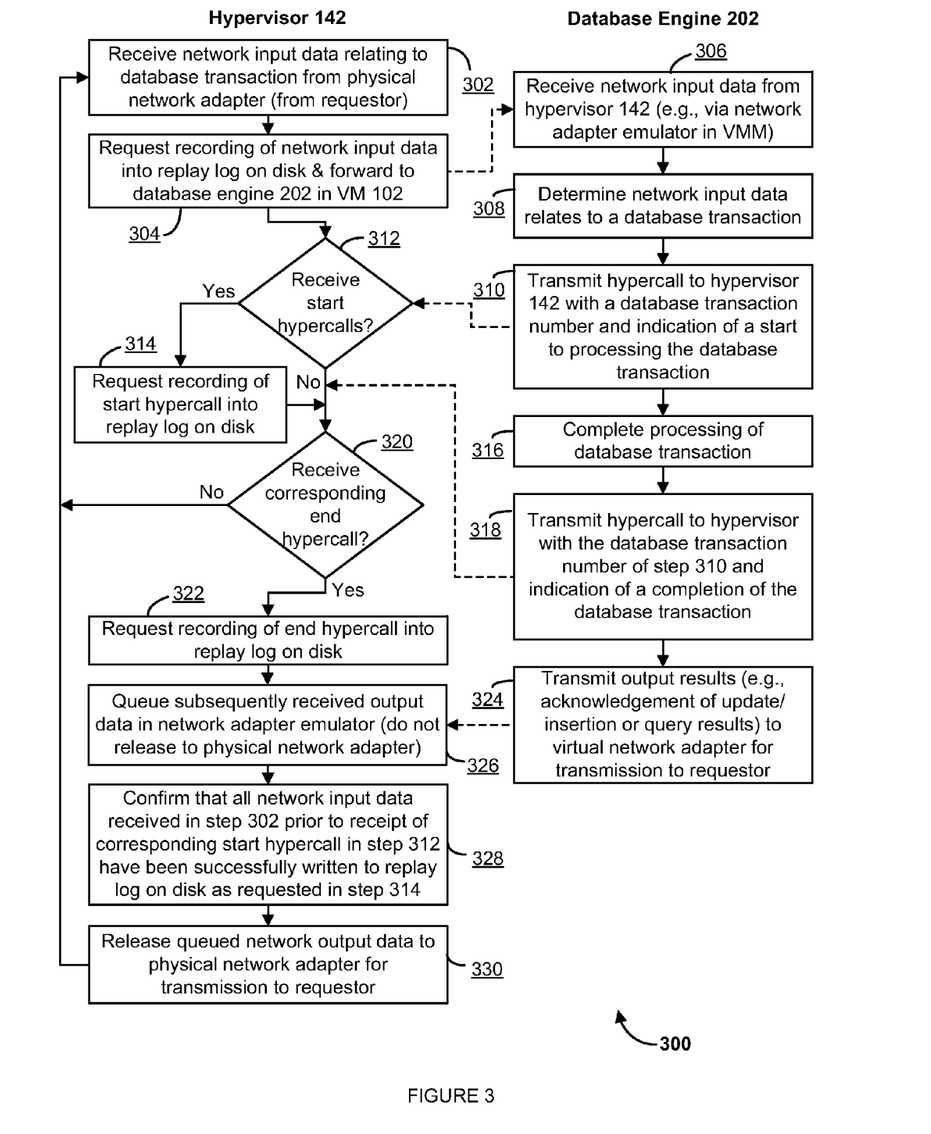
FIG. 3 is a flowchart depicting record and replay techniques according to an embodiment.

Referring now to FIG. 3, a method 300 in accordance with an embodiment of a single threaded in-memory database engine that persists data to a replay log on disk for database transactions is presented. Initially, in step 302, hypervisor 142 receives network input data relating to a database transaction (e.g., select, insert, update transactions, etc.) from a requestor (e.g., a client requesting information from the database, etc.). In step 304, hypervisor 142 requests that the network input data be recorded in the replay log and forwards the network input data to VM 102 (e.g., virtual network adapter 125 via network adapter emulator 144) ultimately for receipt and analysis by database engine 202. Upon its receipt of the network input data in step 306, database engine 202 determines that the network input data relates to a new database transaction in step 308 and, in step 310, notifies hypervisor 142 (e.g., via a hypercall or other similar backdoor means) that it has started processing the new database transaction. In one embodiment, for example, this "start hypercall" includes a database transaction number and an indication that database engine 202 has started processing the transaction. In step 312, hypervisor 142 receives the start hypercall and requests recordation of the start hypercall (or data relating thereto, such as the database transaction number and transaction start indicator) into the replay log on disk in step 314. In step 316, database engine 202 completes processing the database transaction received in step 306 (e.g., in memory) and in step 318 transmits an "end hypercall" to hypervisor 142, for example, including the database transaction number of the corresponding start hypercall in step 310 and an indication that database engine 202 has completed processing such database transaction. Hypervisor 142 receives the end hypercall in step 320 and, in step 322, requests recordation of the end hypercall (or data relating there) into the replay log on disk. In step 324, after transmitting the end hypercall in step 318, database engine 202 subsequently transmits any output results for the database transaction (e.g., acknowledgement of a successful insertion or update, query results, etc.) to virtual network adapter 125 for transmission to the requestor. Upon receipt of such output results in virtual network adapter emulator 144, hypervisor 142, in step 326, acknowledges receipt of the output results to database engine 202 (e.g., thereby allowing database engine 202 to continue execution) but queues the output data within virtual network adapter emulator 144, preventing release of such output data to the physical network adapter. In step 328, hypervisor 142 confirms that all network input data received in step 302 prior to receipt of the start hypercall in step 312 corresponding to the end hypercall in step 320 have been successfully written to the replay log on disk pursuant to the requests in step 314. It should be recognized that any such network input data would include input data relating to the database transaction identified by database engine 202 in step 308, thereby ensuring that any data required for an update or insert transaction has been persistently saved to disk in the replay log, satisfying durability requirements for the ACID model. Upon such confirmation, in step 330, hypervisor 142 releases any queued output data in virtual network adapter emulator 144 received in step 322 after receipt of the corresponding end hypercall in step 320 to physical network adaptor 115 for transmission through the network to the requestor. Because hypervisor 142 has confirmed that the network input data relating to the data transaction has been persistently stored in the replay log in step 328, any corresponding output (e.g., acknowledgement of a successful update or insertion, etc.) can be transmitted to the requestor without violating the goal of durability since the database transaction can be faithfully re-executed in a back-up VM using the replay log upon a failure of VM 102. Furthermore, as FIG. 3 indicates, database engine 202 can continue receiving and processing network input data for new subsequent database transactions (in a single threaded stream) from hypervisor 142 in memory without having to expressly request the writing of update and insertion transactions to disk (and then blocking its execution flow for acknowledgements of successful writes to disk) to ensure durability—instead, the recording of network input events and hypercalls into the replay log (and corresponding delay in transmitting output data until corresponding network input data has been written into the replay log) at hypervisor level ensures that durability is achieved.

In particular, the durability achieved by storage of the replay log in the method of FIG. 3 enables the recovery of VM 102 from a failure. For example, upon a failure of VM 102, a back-up VM can be instantiated and the execution flow of VM 102 can be replayed by the back-up VM by loading the initial stored image checkpoint into memory, reading the stored replay log and transmitting the network input data (and other non-deterministic events) stored in the replay log to the virtual network adapter (or other relevant virtual device) of the back-up VM, for example, up to the last end hypercall that has been recorded in the replay log. Such a replay causes the back-up VM to deterministically replay the execution flow of VM 102 up to the last successfully processed database transaction by database engine 202. In certain embodiments, hypervisor 142, in addition to storing the initial image checkpoint and recording the replay log, may periodically take incremental checkpoint "snapshots" of the memory state of VM 102 (e.g., in order to shorten the size of the replay log and the time needed to start up a back-up VM in event of a failure of VM 102). In one embodiment, such incremental checkpoints store modifications made to the memory state of VM 102 (e.g., dirty memory pages) since the last incremental checkpoint (and, in certain embodiments, replay log 212 may be accordingly trimmed to remove entries relating to events that would have changed the memory state of VM 102 prior to the most recently taken incremental checkpoint). In such embodiments, a latest state of VM 102 is recreated in a back-up VM by loading the memory state up to the latest incremental checkpoint (e.g. loading most recently stored versions of memory pages in the initial image checkpoint and incremental checkpoints, etc.) and replaying replay log based on stored non-deterministic events occurring after the latest incremental checkpoint (e.g., the entire replay log, if it has been continuously trimmed during the checkpointing). In one embodiment, to take an incremental checkpoint snapshot, hypervisor 142 makes the entire memory of the VM 102 copy-on-write and starts copying dirty pages to disk in the background. Alternatively, hypervisor 142 may scan the VM's page tables for dirty pages, replicate the dirty blocks in memory and later flush them to disk. In one embodiment, incremental checkpoint snapshots and replay logs may first be saved to a SSD (e.g., for faster persistence) and later backed up on hard disk. In one embodiment, to make checkpointing faster and help simplify database engine design, database engine 202 may use software transactional memory implemented in the virtualization layer by assigning different regions of its virtual memory with various transactional properties. A memory region is transactional if it atomically rolls up or back at transaction boundaries. Scratch memory can be erased after a transaction finishes and thus doesn't need to be saved during checkpointing. Regular memory is persistent and would persist across transactional boundaries.

In another embodiment, as is typical with DBMS implementations, database engine 202 allocates some of its virtual memory through 2 MB pages and locks underlying guest physical memory. To minimize memory virtualization overhead and reduce translation lookaside buffer (TLB) misses on the extended page tables/nested page tables (EPT/NPT), hypervisor 142 uses 2 MB in addition to 4 KB as the page size for allocation, sharing, tracing and paging.

In another embodiment, database engine 202 is the only application accessing networking which enables hypervisor 142 to coalesce the network packets of VM 102 through network adapter emulator 144 depending on the runtime state of the database engine 202. Incoming network packets are coalesced and delivered lazily when hypervisor 142 detects that the database engine 202 is idle and polling for new database transactions. Once a database transaction starts, however, database engine 202 does not need to receive more network packets for processing the database transaction. Therefore, hypervisor 142 can hold off all network packets received until a database transaction is committed or aborted. Outgoing network packets that are queued in network adapter emulator 144 (e.g., via step 322) can be polled by a separate hypervisor-level thread running on a second CPU core for transmission to the network. Alternatively, instead of using network adapter emulator 144, database engine 204 may communicate with a DBMS front end server application through an inter-VM communication channel implemented in shared memory. Such an alternative embodiment can save a CPU cycles on networking and kernel-user context switches.

As discussed above, in one embodiment, incoming network packets are delivered lazily when a transaction finishes. One threshold condition to deliver new network packets before database engine 202 polls for new input requests is after the previous replay log entries have been saved to disk. This means that, in such an embodiment, completion of a database transaction may take longer than a disk write. However, the increase in transaction latency caused by record and replay is approximately bounded by the time it takes to complete two sequential disk writes (e.g., 0.2 ms on SSD). Transaction throughput will only be slightly lower than if run without record and replay.

In addition to the foregoing record and replay techniques, embodiments may further improve performance of database engine 202 by enabling overcommitment of the memory of the VM 102 by swapping memory pages out to SSD in order to provide more memory to database engine 202 than is allocated to it (or its VM 102). While traditional hard disk has slow random access speed which makes overcommitment of memory impractical, an SSD can deliver high bandwidth (e.g., 250 MB/s for 64 GB disk) and much lower random read latency (e.g., 65 μs), which substantially shrinks the performance gap between memory and SSD.

To avoid memory page misses when database engine 202 processes a particular database transaction, embodiments prefetch memory pages from a swap space in SSD into a global buffer cache in the memory space of hypervisor 142, relying on the SSD's bandwidth and random access speeds to bring the pages into the global buffer memory space before the database engine 202 processes the transaction.

Figure 4:
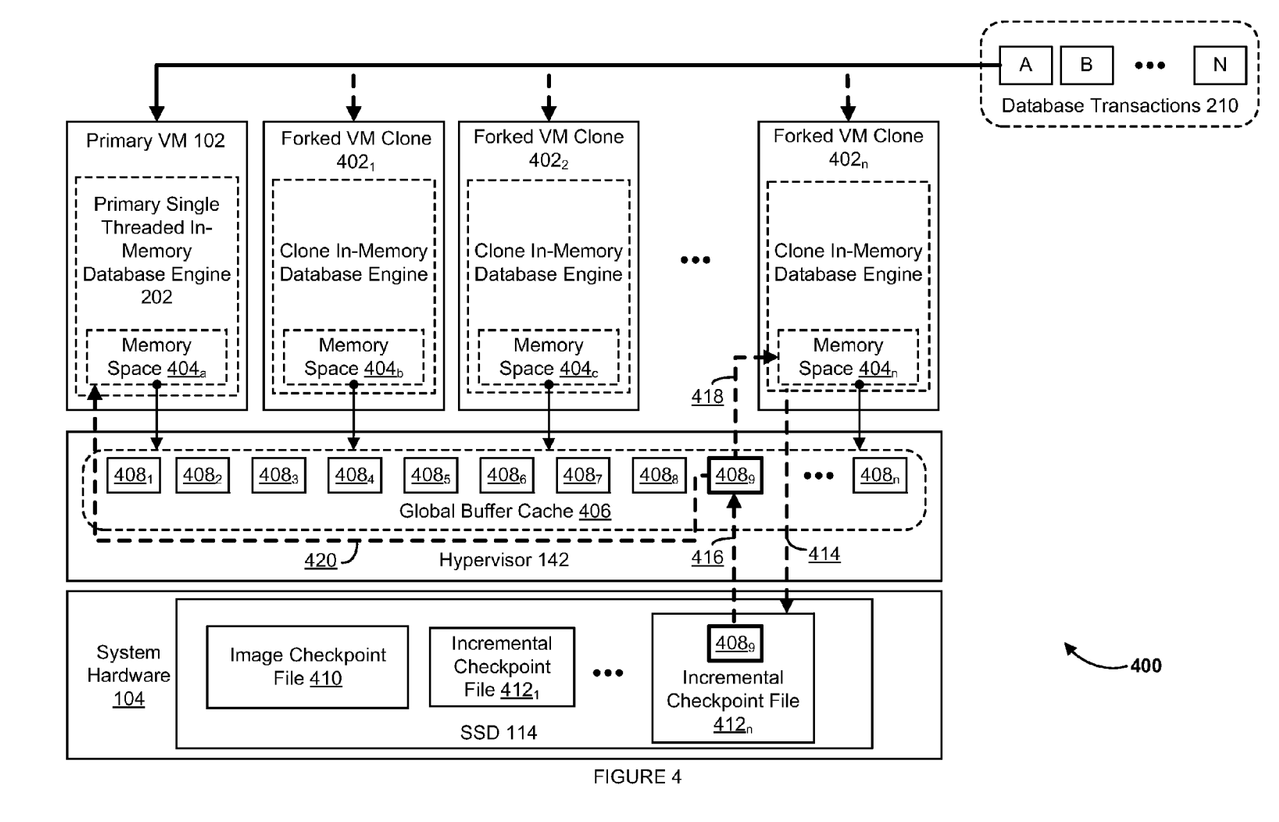
FIG. 4 depicts an in-memory database management system according to an embodiment.

FIG. 4 depicts a computer system architecture 400 that implements the foregoing overcommittment and prefetching capabilities, according to an embodiment. In computer system architecture 400, VM 102 operates as a "primary" VM that runs database engine 202 as a "primary database engine." Hypervisor 142 additionally supports a number of forked VM clones (depicted as $402_1$, $402_2$ and $402_n$) of VM 102 that each also run an in-memory database engine. Each of primary VM 102 and clone VMs $410_1$ to $410_n$ each have their own memory space (e.g., $404_a$ to $404_n$), at least a portion of whose memory pages may be mapped to memory pages (e.g., $406_1$ to $406_n$) that are cached by hypervisor 142 in a global buffer cache 404 in the physical memory of computer system 100. As depicted, memory pages $404_a$ to $404_n$ in global buffer cache are ready-only pages which may be mapped into the memory spaces of multiple VMs (e.g., primary VM 102 and clone VMs $410_1$ to $410_n$). Although not depicted, global buffer cache 404 in embodiments may further include a section of "dirty" memory pages that have been written to during a particular current checkpoint interval. For example, in one embodiment, hypervisor 142 may utilize "copy-on-write" techniques such that if primary VM 102 desires to write to a page in its memory page $404_a$ that is mapped to a read-only memory page (e.g., one of $406_1$ to $406_n$) in global buffer cache 404, hypervisor may copy the read-only memory page into the section of global buffer cache 404 for dirty memory pages and remap the memory page in primary VM's memory space $404_a$ to the new copied memory page in the dirty memory page section, thereby allowing primary VM 102 to perform the write to the dirty memory page.

As depicted in FIG. 4, during its execution and as previously discussed, hypervisor 142 periodically takes and stores incremental checkpoints $412_1$ to $412_n$ in SSD 114, where each such incremental checkpoint reflects changes in the memory state of primary VM 102 (e.g., dirty memory pages) from the prior incremental checkpoint (in addition to storing initial image checkpoint 410 in SSD 114 that is taken prior to the initiation of the recording of replay log 212 as previously discussed). In one embodiment, hypervisor 142 maintains a mapping for the most current versions of memory pages to the appropriate offsets in image checkpoint 410 or incremental checkpoints $412_1$ to $412_n$. For example, if a latest incremental checkpoint includes a version of a memory page (e.g., the memory page was dirtied by primary VM 102 during the latest period between checkpoints and thus flushed to disk), then previously stored versions of the memory page in prior incremental checkpoints or the image checkpoint are outdated (e.g., and can be overwritten or deleted). However, it should be recognized that the use of checkpoints as a swap space in SSD (or an array of SSDs) is merely exemplary and embodiments may utilize alternative memory-to-storage swapping techniques consistent with the teachings herein. Furthermore, it should be recognized that alternative embodiments may further employ additional optimizing techniques to the extent computing resources are available, for example, such as merging certain of incremental checkpoints $412_1$ to $412_n$ into image checkpoint 410 (or each other) to save SSD storage space or utilizing an incremental checkpoint file for more than one checkpoint.

Image checkpoint 410 and incremental checkpoints $412_1$ to $412_n$ are further shared by clone VMs 402 and serve as a swap space in SSD 114 in order to facilitate overcommitment of memory for primary VM 102 and clone VMs 402. For example, as depicted in FIG. 4, clone VM $402_n$ may receive a request to prefetch and process a database transaction (e.g., from the queue of database transactions 210) that requires it to read a memory page $408_9$. Because memory page $408_9$ is not currently mapped in the memory space of clone VM $402_n$ and is also not cached in global buffer cache 406, hypervisor 142 determines the location (see 414) of the most current version of memory page $408_9$ in SSD 114 (i.e., in incremental checkpoint file $412_n$), fetches it into global buffer cache 406 (see 416) and maps the page into the memory space $404_n$ of clone VM $402_n$ (see 418). Subsequently, when primary VM 102 is ready to process the same database transaction, hypervisor 142 will be able to provide and map the version of memory page $408_9$ in global buffer cache 406 to memory space $404_a$ of primary VM 102 without having to accessing SSD 114 (see 420).

While primary database engine 202 processes a current database transaction, clone database engines may pre-process other database transactions (or the network inputs relating thereto) that have been received and queued for processing by the system. For example, in one embodiment, as previously discussed, a separate management VM may handle database connections, receive network inputs and generate and dispatch database transactions to both primary database engine 202 as well as to the clone database engines for pre-processing. In one embodiment, clone database engines process a database transaction in a manner different from the processing of the same database transaction by primary database engine 202. In such embodiments, clone database engines (or a subset thereof) may abide by one or more of the following operational rules: (1) a clone database engine processes a subset of the queued database transactions so that the same database transaction is not processed repeatedly by different clone database engines; (2) a clone database engine converts database transactions involving writes to database tables to reads of the database tables (and similarly, database transactions involving inserts are converted to look-ups); (3) a clone database engine runs a multi-threaded database engine that processes multiple transactions in multiple threads (as opposed to primary database engine 202, which is a single threaded database engine) and, in certain embodiments, the threads run without locking when accessing database tables; (4) instead of faulting in one memory page at a time, each thread requests a range of memory pages, for instance, when it wants to scan a B-tree node (e.g., by transmitting a touch_mem operation to hypervisor 142, in one embodiment); and (5) a clone database engine throws away database transaction results. It should be recognized that alternative embodiments may utilize clone database engines that each behave in the same way, abiding by the same operational rules, or which abide by different operational rules. It should further be recognized that other operational rules may be contemplated in other embodiments. For example, in one alternative embodiment, rather than converting writes to read and inserts to look-ups as previously discussed, code for prefetching a database transaction may be alternatively customized.

Figure 5:
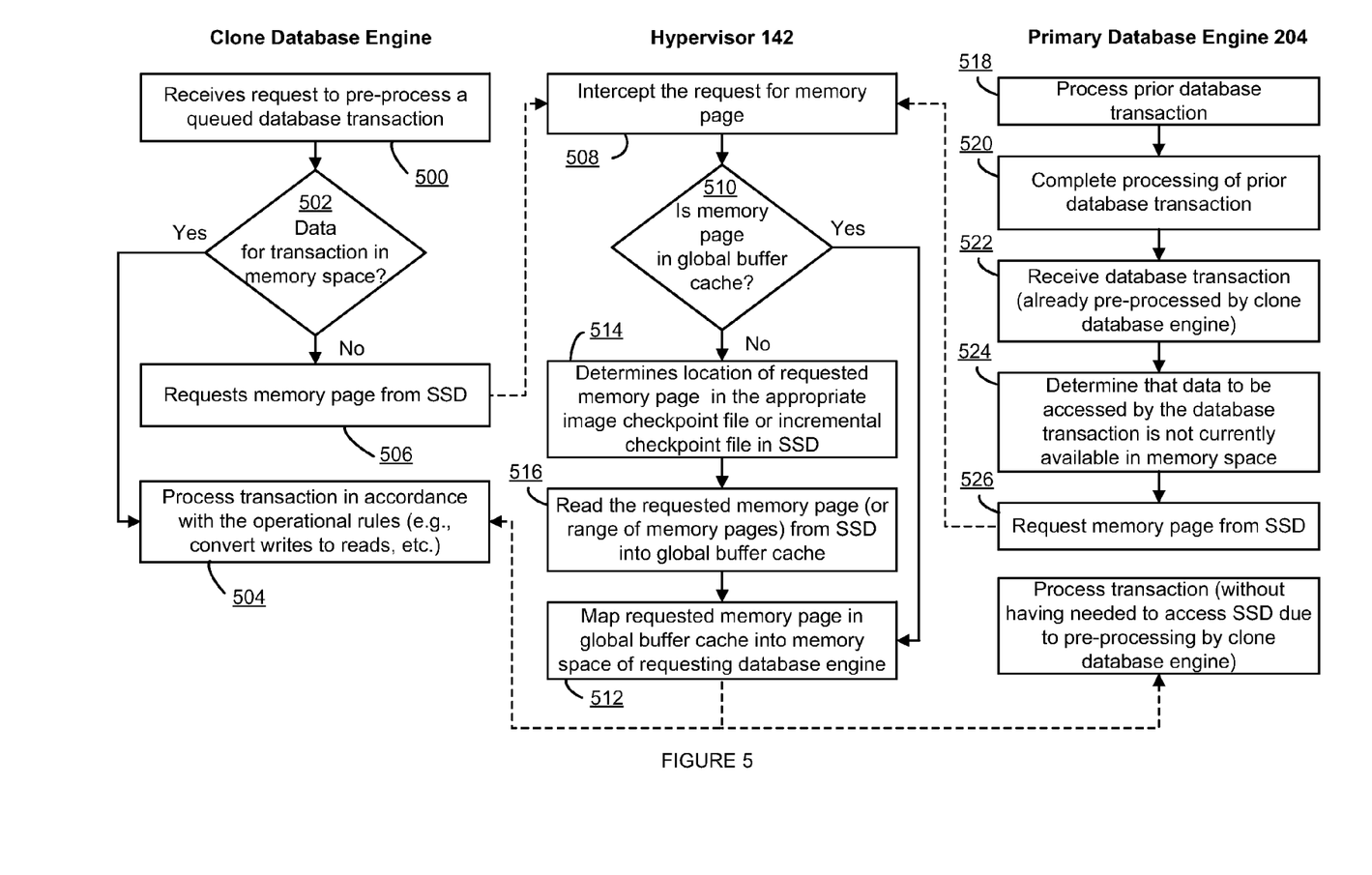
FIG. 5 is a flowchart depicting pre-processing of a database transaction according to an embodiment.

FIG. 5 depicts a flow of steps for prefetching database transactions according to an embodiment. In step 500, a clone database engine (e.g., in one of clone VMs 402) receives a request (e.g., from a management VM as previously discussed in one embodiment) to pre-process and pre-fetch a queued database transaction that is waiting to be processed by primary database engine 202. In step 502, the clone database engine determines whether the data to be accessed by the database transaction resides in a memory page currently available in its memory space. If the memory page is available, then in step 504, the clone database engine processes the transaction by accessing the memory page (e.g., in accordance with the operational rules for the clone database engine, as previously discussed). However, if the memory page is unavailable, then in step 506, the clone database engine requests the memory page from the swap space (e.g. SSD 114). In one embodiment, such a request may manifest as a trap into the guest OS and/or hypervisor 142. In step 508, hypervisor 142 intercepts the request and, in step 510, checks global buffer cache 406 to determine whether the requested memory page may have been cached by a previous database transaction. In step 512, if the requested memory page is in global buffer cache 406, hypervisor 142 maps the requested memory page into the memory space of the clone database engine, thereby allowing the clone database engine to proceed to step 504 to process the database transaction. However, if the requested memory page is not in global buffer cache 406, then in step 514, hypervisor 142 determines the location of the memory page (or a range of memory pages including the requested memory page, in an embodiment) in the appropriate image checkpoint file or incremental checkpoint file in SSD 114 and, in step 516, reads the requested memory page (or range of memory pages) into global buffer cache 406 (in one embodiment, as read-only). Hypervisor 142 then proceeds to step 512 where it maps the requested memory page in global buffer cache 406 to the memory space of the cloned database engine (e.g., by mapping the memory page into the "physical" memory of clone VM 402 hosting the cloned database engine, which then gets mapped to the memory space of the cloned database engine by the guest OS, etc.), thereby enabling it to proceed to step 504 to process the transaction.

In the meanwhile, primary engine database 202 may be processing a prior database transaction, in step 518, and upon completion of the database transaction in step 520, may proceed to process the database transaction just pre-processed by the clone database engine (e.g., if it is next in database transaction queue 210, for example) in step 522. In step 524, primary database engine 202 determines that the data to be accessed by the database transaction is not currently available in its memory space. In step 526, primary database engine 202 requests the memory page from swap space (e.g. SSD 114). Returning to step 508, hypervisor 142 intercepts the request and, in step 510, determines that the requested memory page has been cached in global buffer cache 406 by a previous database transaction, namely the previously discussed transaction by the clone database engine. As such, hypervisor 142 is able proceed to step 512 to map the requested memory page into the memory space of primary database engine 202 (e.g., by mapping the memory page into the "physical" memory of primary VM 102 hosting primary database engine 202, which then gets mapped to the memory space of the primary database engine 202 by the guest OS, etc.), thereby enabling primary database engine 202 to process the database transaction in step 532 without need to access SSD 114. For example, if the database transaction is an update transaction, primary database engine 202 may write to the requested memory page, thereby causing hypervisor 402 to copy the requested memory page from its read-only copy in global buffer cache 406 into the dirty memory page section of global buffer cache 406, thereby enabling the update transaction to write to the requested memory page.

It is to be appreciated that embodiments of the methods and apparatuses discussed herein are not limited in application to the details of construction and the arrangement of components or steps set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one of the embodiments are not intended to be excluded from a similar role in any other embodiments. For example, although the embodiments herein depict multiple VMs running on single host, alternative embodiments may utilize a cluster of hosts as a share-nothing parallel DBMS VM cluster. Similarly, additional hosts may run VMs that serve as hot standbys for fail-over in other embodiments In yet another embodiment, speculative execution, i.e., a "speculative run," may be implemented to prefect data. With speculative execution, the same database transaction is executed in several speculative runs with different branches being taken when some conditions are being tested. Speculative runs are encapsulated in separate VMs, however, the results of the speculative runs are irrelevant. The effectiveness of a speculative run is measured by how accurately data blocks can be prefetched from storage. To achieve higher transaction throughput, embodiments launch a large number of queries for fetching data blocks for many transactions at the same time to fully utilize the low-latency, high-throughput, random reads in SSD storage. Also, the phraseology and terminology used herein are for the purpose of description and should not be regarded as limiting. The use herein of "including," "comprising," "having," "containing," "involving," and variations thereof, is meant to encompass the items listed thereafter and equivalents thereof as well as additional items.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g., diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of running a database management system (DBMS) in a virtual machine (VM) to preserve a durability property of the atomicity, consistency, isolation, durability (ACID) model for database management, the method performed by a hypervisor supporting the VM comprising:
   receiving input data associated with a database transaction;
   requesting recordation of the input data into a log stored in a persistent storage device, wherein the log stores non-deterministic events occurring during an execution flow of the VM to preserve a capability to subsequently replay the execution flow of the VM;
   forwarding the input data to the VM for processing by the DBMS running in the VM;
   receiving an indication of a start of processing of the database transaction by the DBMS and identification of the database transaction after the VM receives the input data;
   receiving an indication of a completion of processing of the database transaction by the DBMS;
   delaying, in a queue, outgoing output data received from the VM subsequent to the receipt of the completion indication by the DBMS; and
   releasing the delayed outgoing output data from the queue upon a confirmation that all input data associated with the database transaction received prior to the receipt of the start indication has been successfully stored into the log, thereby preserving durability for the database transaction.

2. The method of claim 1, further comprising:
   recording an entry for the start indication into the log; and
   recording an entry for the completion indication into the log.

3. The method of claim 1, wherein the steps of receiving the start indication and receiving the completion indication utilize a hypercall made by the DBMS to the hypervisor.

4. The method of claim 1, wherein the persistent storage device is a solid-state drive (SSD).

5. The method of claim 1, further comprising periodically storing incremental checkpoints of a memory state of the VM.

6. The method of claim 1, wherein the step of forwarding the input data occurs upon a detection that the DBMS is idle.

7. The method of claim 1, wherein the forwarding the input data to the VM is performed by a management VM that receives the input data, converts the input data to a database transaction and then forwards the database transaction to the VM.

8. A computer system supporting a database management system (DBMS) that preserves a durability property of the atomicity, consistency, isolation, durability (ACID) model for database management, the computer system comprising:
   a persistent storage device; and
   a processor supporting the running of the DBMS in a virtual machine (VM) and a hypervisor supporting the VM, wherein the processor is configured to execute the hypervisor to perform the steps of
   receiving input data associated with a database transaction,
   requesting recordation of the input data into a log stored in the persistent storage device, wherein the log stores non-deterministic events occurring during an execution flow of the VM to preserve a capability to subsequently replay the execution flow of the VM,
   forwarding the input data to the VM for processing by the DBMS running in the VM,
   receiving an indication of a start of processing of the database transaction by the DBMS and identification of the database transaction after the VM receives the input data,
   receiving an indication of a completion of processing the database transaction by the DBMS,
   delaying, in a queue, outgoing output data received from the VM subsequent to the receipt of the completion indication by the DBMS, and
   releasing the delayed outgoing output data from the queue upon a confirmation that all input data associated with the database transaction received prior to the receipt of the start indication has been successfully stored into the log, thereby preserving durability for the database transaction.

9. The computer system of claim 8, wherein the processor is further configured to perform the steps of:
   recording an entry for the start indication into the log; and
   recording an entry for the completion indication into the log.

10. The computer system of 8, wherein the steps of receiving the start indication and receiving the completion indication utilize a hypercall made by the DBMS to the hypervisor.

11. The computer system of claim 8, wherein the persistent storage device is a solid-state drive (SSD).

12. The computer system of claim 8, wherein the processor is further configured to periodically store incremental checkpoints of a memory state of the VM.

13. The computer system of claim 8, wherein the step of forwarding the input data occurs upon a detection that the DBMS is idle.

14. The computer system of claim 8, wherein the forwarding the input data to the VM is performed by a management VM that receives the input data, converts the input data to a database transaction and then forwards the database transaction to the VM.

15. A non-transitory computer readable storage medium storing instructions for operating a database management system (DBMS) in a virtual machine (VM) and a hypervisor supporting the VM running on a computer system to preserve a durability property of the atomicity, consistency, isolation, durability (ACID) model for database management, wherein the instructions, when executed in the computer system, cause the computer system to carry out the steps performed by the hypervisor of:

receiving input data associated with a database transaction;

requesting recordation of the input data into a log stored in a persistent storage device, wherein the log stores non-deterministic events occurring during an execution flow of the VM to preserve a capability to subsequently replay the execution flow of the VM;

forwarding the input data to the VM for processing by the DBMS running in the VM;

receiving an indication of a start of processing of the database transaction by the DBMS and identification of the database transaction after the VM receives the input data;

receiving an indication of a completion of processing the database transaction by the DBMS;

delaying, in a queue, outgoing output data received from the VM subsequent to the receipt of the completion indication by the DBMS; and     releasing the delayed outgoing output data from the queue upon a confirmation that all input data associated with the database transaction received prior to the receipt of the start indication has been successfully stored into the log, thereby preserving durability for the database transaction.

16. The non-transitory computer readable storage medium of claim 15, further including instructions for:

recording an entry for the start indication into the log; and     recording an entry for the completion indication into the log.

17. The non-transitory computer readable storage medium of claim 15, wherein the steps of receiving the start indication and receiving the completion indication utilize a hypercall made by the DBMS to the hypervisor.

18. The non-transitory computer readable storage medium of claim 15, wherein the persistent storage device is a solid-state drive (SSD).

19. The non-transitory computer readable storage medium of claim 15, further including instruction to periodically store incremental checkpoints of a memory state of the VM.

20. The non-transitory computer readable storage medium of claim 15, wherein the step of forwarding the input data occurs upon a detection that the DBMS is idle.

* * * * *